April 19, 1960  E. SCHNITZER  2,933,310
FLOATING PISTON BAND PASS SHOCK ABSORBER
Filed April 22, 1958
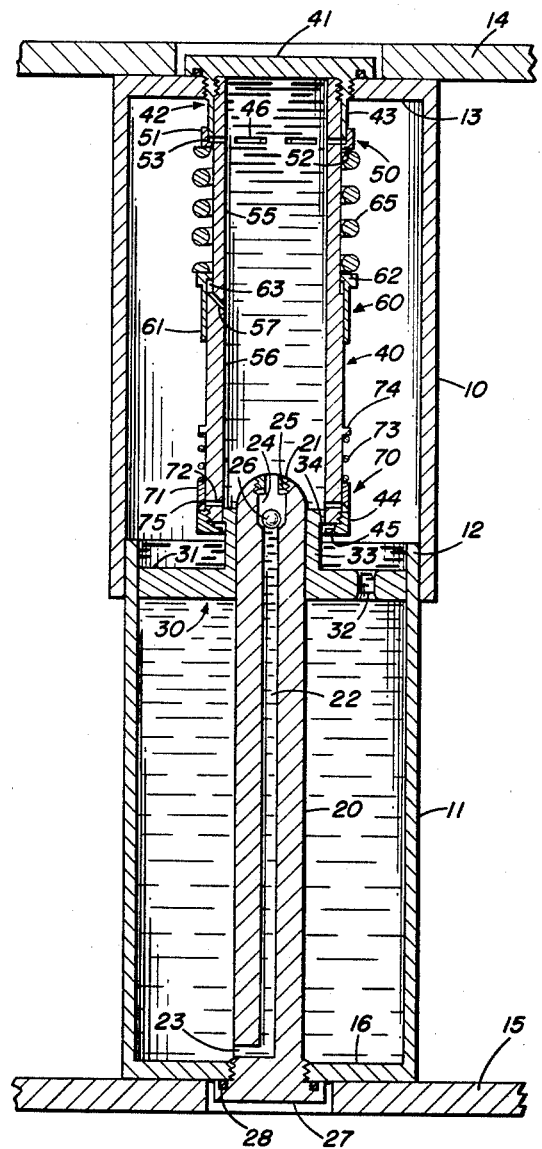
INVENTOR
*EMANUEL SCHNITZER*
BY R. I. Tompkins
ATTORNEY

2,933,310
FLOATING PISTON BAND PASS SHOCK ABSORBER

Emanuel Schnitzer, Newport News, Va.

Application April 22, 1958, Serial No. 730,237

9 Claims. (Cl. 267—64)

(Granted under Title 35, U.S. Code (1952), sec. 266)

The invention described herein may be manufactured and used by or for the Government of the United States of America for governmental purposes without the payment of any royalties thereon or therefor.

This invention relates to shock absorbers and, more particularly to single acting shock absorbers of the band pass type in which the damping is controlled by a floating piston.

In my copending application, Serial No. 528,563, filed August 15, 1955, now U.S. Patent No. 2,866,633, issued December 30, 1958, there is described a frequency selective shock absorber in which the frequency control is directly related to the size of a variable orifice in a barrier between opposed fluid containers in the shock strut. One important disadvantage of this control lies in the fact that, above a given flow rate, the increased size of the orifice offers an appreciable restriction to the flow so that the increased orifice opening cannot be used to reduce the strut damping at very high frequencies or rates of load application as is desired for a low pass oleo for example. To overcome this difficulty the present invention utilizes a so-called floating piston between the strut fluid chambers; the reaction force on the strut varying as a function of the rate of loading in accordance with the tightness of the hydraulic coupling between the piston and the piston supporting tube.

A primary object of the invention, therefore, is to provide strut control which permits important extension of the upper limiting rate of loading at which load pulses are not transmitted. An object, also, is to provide shock absorber control which prevents transmission of loads at particularly high rates of loading while at the same time operates effectively at low loading rates to transmit and absorb load pulses. An additional object is to provide means for utilizing a floating piston control effectively in a band pass shock absorber.

Other objects and many of the attendant advantages of this invention will be readily appreciated as the same becomes better understood by reference to the following detailed description when considered in connection with the accompanying drawings wherein: the figure is a sectional view taken longitudinally through a shock absorber strut exemplifying the invention.

Referring to the figure there is shown a strut including two hollow cylinders 10 and 11, cylinder 10 being also referred to as the receiver and cylinder 11 as the plunger. The plunger 11 telescopes within the receiver 10 and is adapted to be filled with a liquid such as oil, the oil level normally being above the inner end 12 of the plunger, as indicated in the figure. As shown, the plunger forms a telescopic connection with the receiver, the plunger outer diameter being slightly less than the inner diameter of the receiver to permit entry of the inner plunger end into the receiver and sliding movement between these strut sections. In use the receiver is attached at its outer end 13 to one machine element, as an aircraft body 14, and the plunger to a coacting machine element such as an aircraft wheel 15.

Fixedly attached to the outer end 16 of the plunger 11, as by screwthreads formed on a central opening in this end, is a plunger pin 20, this pin projecting axially within the plunger cylinder from the outer end 16 to a point beyond the inner end 12 of the plunger. This plunger pin is shown as of uniform diameter and relatively small size with the inner end 21 rounded. A central duct 22 extends from the rod end 21 to a point adjacent the outer end 16 of the plunger where a radial outlet 23, into the plunger interior, is formed. The inner end of the duct is enlarged symmetrically to form a recess 24 for a ball check valve, a reducing fitting 25 being threaded into the open end of the recess to limit the free movement of valve ball 26. The inner end of the fitting 25 is ridged so as to permit fluid flow into the control cylinder. Also the outer end 27 of the plunger rod projects beyond the plunger end 16 and is enlarged to form a close fitting cap, an annular groove being formed on the inner face of the cap to receive the leak preventing packing ring 28.

Slidably engaging the outer surface of plunger rod 20 is the piston 30. This piston consists of a flat thick circular plate 31 adapted to extend transversely across the plunger interior between the plunger pin 20 and the plunger wall, there being a single orifice 32 formed in the piston about midway between the plunger pin and wall. Preferably, the ends of this orifice, on both sides of the piston, are flared to assure proper hydraulic flow. The piston is centrally apertured and has an axially projecting tube 33 attached thereto in extension of the aperture, the outer end of the tube being flanged to provide a slide stop 34. The tube is dimensioned to fit slidably on the plunger pin 20.

Contained in the receiver 10, and positioned directly above the plunger pin 20, is the high pressure control cylinder 40. This cylinder depends from the outer end plate 13 of the receiver 10, to which it is attached at its outer end by a cap plate 41 provided with a laterally projecting tube 42 and adapted to project inwardly into the receiver through an opening formed in the end plate 13. Screwthreads on both inside and outside of tube 42, adjacent the cap 41, are provided for attachment of the tube to the threaded wall of the opening in receiver end wall 13 and the externally threaded outer end of cylinder 40. The lower end of the cylinder 40 receives the inner end of the plunger pin 20 for slidable movement therewith, the slide stop 34 slidably engaging the inner wall of tube 40. The lower end of tube 40, also, is externally screwthreaded to receive the stop ring 44; an annular flange 45, integral with the outer edge of this ring, projecting radially towards the plunger pin and forming at its end a stop for engagement with slide stop 34 on piston tube 33, to limit relative sliding movement between the piston and cylinder 40.

The cap tube 42, projecting inwardly into receiver 10 from end plate 13, includes with the threaded section a smooth cylindrical extension 43 which projects a short distance along the outer wall of cylinder 40, terminating at the upper line of a series of displaced alined ports 46 formed in the cylinder wall. These ports constitute passages for escape of fluid from the central cylinder 40. A sleeve piston-valve 50, comprising a narrow ring 51 overlying the tube extension 43 terminates, on its lower or piston-side edge, in a fixed annular flange 52 which projects inwardly radially into contact with the control cylinder forming a pressure region 53. With no pressure in chamber 53 the position of the valve is closed, as shown in the figure; but, when pressure develops, the valve is forced downwardly, opening ports 46 for free flow of fluid therethrough.

About midway along the length of tube 40, the wall thickness, moving downwardly, is abruptly increased producing in effect two cylindrical sections 55 and 56, with an abrupt shoulder separating them. Opening into this shoulder at an angle of about 45 degrees is a bleed duct 57. An annular control piston 60 is mounted slidably on tube section 56, this piston consisting of a lower tube section 61 having a slide contact with tube section 56 and an upper flange section 62 having a slide contact with tube section 55. It is, thus, seen that the tube and flange sections define a permanently closed chamber 63 of variable volume, depending on the position of the piston, and the effective pressure area of this piston is determined by the difference between the areas of cylinder sections 55 and 56. It also appears that the pressure applied to this piston results from fluid inflow through bleed duct 57 into the control piston chamber 63.

Interposed between control piston 60 and sleeve valve 50 is a coil spring 65, the size and tension of the spring being such as normally to maintain valve 50 closed with the control piston at its lower limit of movement. It is pointed out that the length of valve ring 51 is less than the distance of compression of spring 65 from neutral to completely compressed position, so that ports 46 will be wide open on high fluid compression in the control cylinder 40. Also, the lower end of tube 40 bears a check valve 70 comprising slide ring 71 slidably mounted on the cylinder 40 so as normally to rest on the fixed end ring 44 and close the alined circumferential ports 72. To facilitate the opening of these ports, the lower edge of ring 71 is angled upwardly and inwardly, as indicated at 75, so that the inner ring wall is shorter than the outer ring wall. Thus, fluid pressure in the control cylinder will tend to cam the sleeve upwardly to open the ports 72. Coil spring 73, bearing on the upper edge of sleeve 71 and against cylinder flange 74, is under compression to urge the sleeve downwardly, into closed position. It is noted, that ports 72 may be closed on the inside of cylinder 40 by upward movement of piston 30, the radial annular surface of slide stop 34 either covering or passing by these ports.

The operation of the described shock absorber follows, assuming the indicated oil supply in the plunger and receiver, and air under moderate pressure, in excess of atmospheric pressure, in the receiver. When the plunger and receiver are telescoped together under the influence of a slowly applied load, piston 30 is raised by virtue of being effectively floated on the fluid in the plunger and, consequently, closes the ports 72 in the check valve 70. Plunger pin 20 is also raised and thus fluid is displaced upwardly in control cylinder 40, ball valve 25—26 being closed by the control tube-fluid pressure. The exposed areas of piston 30 in cylinder 40 aid in this fluid displacement. Since the top valve 50 is held closed by control piston 60 operating through spring 65, the pressure in control cylinder 40 increases to a point where piston 30 is forced down to sleeve seat 45. This raises the pressure in the plunger, forcing fluid from the plunger through orifice 32 into the receiver. Since the pressure is increasing in cylinder 40 at a low rate commensurate with the low rate of strut loading, fluid is forced through bleed orifice 57 into bleed chamber 63 fast enough to keep sleeve valve 50 closed, by virtue of power transmission from the control piston through the spring 65 to the sleeve 50. The effective piston area of sleeve valve 50 in region 53 should be equal to or slightly smaller than the effective piston area of control piston 60 in region 63 in order to just maintain valve 50 closed. When piston 30 is forced down close to its seat by the high pressure in cylinder 40, ports 72 uncovered by this piston just enough to allow fluid to escape from control cylinder 40 at the same rate that the fluid is displaced by plunger pin 20. Check valve ring 71 is forced open by the fluid leaving cylinder 40.

Upon removal of the slowly applied load, the air pressure in cylinder 10 forces the fluid back through orifice 32 into cylinder 11 and, at the same time, returns piston 30 (assuming some upward displacement has occurred) down on seat 45. Thus, cylinder 11 is forced downward, pulling pin 20 out of control cylinder 40 with a consequent reduction of pressure therein, check valve 70 is closed by spring 73 and control piston 60 is forced down on its seat by spring 65, this spring also maintaining valve 50 in its closed position. Ball valve 25—26 rises to open passage 22, thus allowing fluid to flow from cylinder 11 into cylinder 40. It is pointed out that a strut action includes a complete strut cycle, i.e. a compression and return stroke.

Under the influence of a rapidly applied load, the pressure in cylinder 40 increases rapidly from the upward motion of piston 30 and pin 20. Since, however, fluid can pass through bleed orifices 57 into region 63 only at a slow rate, piston 60 does not compress spring 65 fast enough to keep valve 50 closed. Therefore, fluid passes freely from cylinder 40 through ports 46 into the receiver 10, with the result that only a low pressure is sustained in cylinder 40 on top of piston 30. Thus, piston 30 is free to float on top of the fluid in cylinder 11 and is effectively disconnected from cylinders 10 and 40, and, as a result, only a small load is developed in the strut.

On completion of the fast load pulse, the air in the upper cylinder 10 again returns piston 30 to its lower position against stop 45 and re-extends the strut. It is, therefore, evident that this strut recycles itself automatically for successive rapidly applied loads, since very little fluid passes through main orifice 32 during these pulses and piston 30 merely rides up and down on the fluid; a frequency selective snubber, therefore, is not necessarily required for this type of shock strut, but if found desirable a conventional shock strut check valve snubber with a slow return bleed orifice can be constructed over orifice 32 to allow normal flow up and restricted flow down.

It is of interest to note that in the described floating piston type of band pass shock absorber the size of orifice 32 may or may not be constant. Also, it is observed that the reaction force on the strut is varied as a function of loading by the tightness of the hydraulic coupling between the piston and the piston supporting tube; or, in other words the piston is supported on a column of oil which may be made either rigid by confining it or soft by allowing it to flow away through ports into another receptacle. Thus, the maximum rate of loading is not determined by the maximum size of piston orifice as in prior devices but depends only on the finite inertia of valve 50 and the flow restriction of ports 46. That these limitations do not offer serious difficulty is apparent from consideration of the fact that, at a given high rate of loading for the floating piston and variable orifice type of struts, in the floating piston type sleeve valve 50 is required to move much slower than the orifice adjusting plunger in the variable orifice strut; also, the floating piston strut ports 46 offer much less restriction to the flow of the small amount of fluid escaping from control cylinder 40 than the main orifice in a variable orifice strut offers to fluid escaping from the entire lower cylinder into the upper cylinder. In addition, since the pressure in control cylinder 40 is several times the pressure existing in the lower cylinder of a variable orifice strut, the escape velocity of fluid from control cylinder 40 is much higher than that through the main orifice of the variable orifice type absorber.

Obviously many modifications and variations of the present invention are possible in the light of the above teachings. It is therefore to be understood that within the scope of the appended claims the invention may be practiced otherwise than as specifically described.

What is claimed is:

1. A shock absorber for machine parts comprising a hollow cylinder closed at one end forming a plunger; a hollow cylinder closed at one end forming a receiver; said plunger and receiver being adapted to be attached to supporting and relatively movable machine parts at their closed ends and engaging each other in telescopic relation at their open ends, the plunger entering the receiver to form a strut; a pin having a free end mounted in and attached to said plunger and extending coaxially thereof to a point beyond the open end of said plunger; a piston having an axially projecting tube attached thereto, said piston and said tube being slidably mounted on said pin, said piston extending transversely across the plunger interior, said tube having a flange to provide a stop, said piston having an orifice therethrough; a control cylinder having an open end, positioned in and attached to said receiver in alinement with said pin, said control cylinder receiving said tube flange in its open end for sliding movement therein; a stop at the open end of said control cylinder to limit the range of piston movement; a bleed duct through the wall of said control cylinder; means forming with said control cylinder a permanently closed expansible bleed chamber communicating with said bleed duct; a port in the wall of said control cylinder; a ring movable over said port to prevent fluid flow therethrough; and connecting means between said chamber forming means and said ring to close said port on expansion of said bleed chamber.

2. The shock absorber as defined in claim 1, said absorber containing a liquid sufficient to fill the plunger chamber and air under pressure in excess of atmospheric, filling the receiver.

3. The shock absorber as defined in claim 1, said ring having a pressure chamber therein adapted to receive fluid under pressure from said control cylinder through said port.

4. The shock absorber as defined in claim 3, said connecting means being in the form of a spring.

5. The shock absorber as defined in claim 4, said ring having a length less than the compressible distance of said spring from neutral spring position, whereby said ports are adapted to be opened under high pressure conditions in said control cylinder.

6. The shock absorber as defined in claim 1, and means for evacuating said control cylinder when a predetermined pressure is obtained in said control cylinder during strut compression.

7. The shock absorber as defined in claim 6, said control cylinder evacuating means including an evacuation port through the wall of said control cylinder in the area adjacent said tube flange, said evacuation port being subject to closure by the movement of said piston on compression of said strut.

8. The shock absorber as defined in claim 7 and additional means for refilling said control cylinder with liquid after each strut action.

9. The shock absorber as defined in claim 8, said additional means comprising a slide ring positioned on and outside of said control cylinder to cover said evacuation port, means on said ring to facilitate slide movement thereof to open said evacuation port, means normally holding said ring in position to close said evacuation port, a passage in said pin communicating with said plunger and control cylinder, and valve means in said passage for preventing fluid flow into said plunger.

References Cited in the file of this patent
UNITED STATES PATENTS

| | | |
|---|---|---|
| 2,616,687 | Butterfield | Nov. 4, 1952 |
| 2,724,590 | Irwin | Nov. 22, 1955 |

FOREIGN PATENTS

| | | |
|---|---|---|
| 554,732 | Great Britain | July 16, 1943 |